Patented Apr. 27, 1926.

1,582,056

UNITED STATES PATENT OFFICE.

CARL KULAS, OF LEIPZIC, AND CURT PAULING, OF LEIPZIC-LINDENAU, GERMANY, ASSIGNORS TO CARL KULAS, OF LEIPZIC, GERMANY.

PROCESS FOR THE MANUFACTURE OF RESINOUS PRODUCTS OF CONDENSATION FROM PHENOL AND FORMALDEHYDE.

No Drawing.　　　Application filed August 13, 1921. Serial No. 492,177.

*To all whom it may concern:*

Be it known that we, CARL KULAS and CURT PAULING, both of us citizens of the German Republic, residing at Leipzic and Leipzic-Lindenau, Germany, respectively, have invented certain new and useful Improvements in a Process for the Manufacture of Resinous Products of Condensation from Phenol and Formaldehyde, of which the following is a specification.

In our U. S. Patent No. 1,414,139, we have described a process in which the condensation of phenol and formaldehyde is effected in two phases. We obtain by such process resins of various nature, the products being partly fusible and partly infusible and can be applied in industrial arts in many ways.

The object of our present invention is the manufacture of hardened resinous products of amber- or ivory-like appearance from phenol and formaldehyde by the process described in the above named patent, which may be termed a "two-phasic" process.

The hardening of the resins and the conversion of the fusible resins into the final state i. e. infusible state is a matter requiring very careful attention and always yields transparent amber or horn like products, unless filling materials were embodied into the resin before the hardening takes place.

The known artificial resins of the market are hardened, as a rule, by filling the fused mass into moulds and placing them in drying chambers, which in the beginning are only heated up to about 40° C. Gradually, say in about 16 to 24 hours the temperature is increased to 150–160° C. according to the size and strength of the articles to be hardened.

By another process the artificial resins are hardened within a few hours in heated vessels under pressure by allowing the pressure and gradually increased heat to act on the artificial resins.

Other kinds of artificial resins, again, are converted under the combined action of hydraulic pressure and heat into the infusible state. In this case it is imperative for the resins to contain a certain percentage of filling materials, as otherwise the resins become very soft and liquid in the heat and are squeezed out through openings in the moulds before the resin has attained a semi-solid plastic state.

All those methods of hardening yield no faultless products, because the resinous products of condensation have a tendency to continue and finish their condensing reaction during the hardening process. They expand in the moulds considerably, whereby blisters, cracks and so forth are produced and in spite of the greatest care and attention the percentage of defective articles is very great and adds to the cost of the hardened goods.

We have found, that the cause of all those failures is not due to the method of hardening but to the process of preparing those resins. Whenever, the artificial resins are prepared by a mono-phasic process, the reaction setting in from the very beginning is very energetic and a great deal of experience is required, to prevent the reaction from going too far, so that the product obtained is infusible having passed the fusible intermediate state against the operator's will and intention. The more the reaction proceeds during the manufacture all the greater is the danger of the product of reaction becoming insoluble and infusible within a few seconds quite suddenly inside the reaction vessel. On the other hand the acid resin produced in the first phase of the two-phasic process acts in a way like damping the reaction of the second phase of the process. That property is to be noted by the fact that the two-phasic resins do not harden so quickly as the resins produced by a mono-phasic process. For many applications in the arts that slow hardening of the resin is a great advantage.

All the drawbacks mentioned above, can be avoided by the present process, which allows to produce with the greatest safety and regularity products of condensation from phenol and formaldehyde, to be hardened in a most simple manner or in a water-bath or in drying chambers without loss by cracking blistering and the like.

The products obtained can be converted according to the quantity of formaldehyde used during their manufacture (with or without the addition of glacial acetic acid) in transparent final products of amber-like or ivory-like appearance.

The hardened articles can be more readily worked by a lathe or polishing machine owing to their elasticity than the products of condensation now in the market.

The process of condensation of phenol and formaldehyde is effected by a two-phasic method in the same manner as described in the older process, U. S. Patent 1,414,139. The following examples show the details of the process proper.

*Example I.*

0,2 kilo of phenol (0,2 kilo of crystallized phenol and 20 gr. of water), 0,2 kilo of formaldehyde 30%, 5,0 gr. of hydrochloric acid 1,15 spec. grav. or 5,0 gr. of oxalic acid, are boiled together until the formation of resin has taken place. Then are added: 0,8 kilo of phenol (0,8 kilo crystallized phenol and 80 gr. water), 2,8 kilo of formaldehyde 30%, and 0,1 kilo of sodium carbonate or the equivalent quantity of a potassium hydrate solution of 40° B. The whole is then boiled once more until the new formation of resin is finished.

That recipe yields a product of ivory like appearance, but it still requires an addition of glacial acetic acid, as mentioned below.

*Example II.*

0,2 kilo of phenol (0,2 kilo crystallized phenol and 20 gr. water), 0,2 kilo of formaldehyde 30%, and 5 gr. hydrochloric acid 1,15 spec. grav. or oxalic acid. The mixture is boiled for some time, until the formation of resin has set in. Then are added: 0,8 kilo of phenol (0,8 kilo crystallized phenol and 80 gr. water), 0,8 kilo of formaldehyde 30%, and 0,2 kilo of sodium sulphite. The whole is then boiled once more until the new formation of resin is finished.

That recipe yields a product of amber-like appearance and requires no addition of acetic acid.

All the same, whether the mass is prepared according to recipe I or II, it is allowed to stand quietly for some hours until all the water has collected on the top. The supernatant liquor is drawn off and the mass is thoroughly washed, at first with acidulated water and then with pure water.

Finally a mixture of 25 gr. amyl alcohol, 15 gr. camphor oil and/or 10 gr. glycerine is added to the quantity of washed resin prepared above and the mass finally heated about 110° C.

If it be desired to produce transparent products of condensation, it is profitable to heat the resinous mass to about 100 to 110° C. before pouring it into the moulds so long until all the adhering water is driven out. If the final product is to be of ivory like appearance, it is desirable to add a quantity of glacial acetic acid to the liquid resin, shortly before final heating and before pouring the mass into moulds. The quantity to be added may vary and can be increased up to about 3% of the weight of the phenol actually used for making the resin.

Further additions of filling materials and dyestuffs to the resinous mass before pouring it into the moulds give rise to various effects as regards colour and appearance so that it is possible to prepare masses which have the appearance of coral, tortoise-shell and the like.

If the mass is prepared, as above mentioned, by a two-phasic process, it is possible to harden it and to convert it into the insoluble and infusible state by suspending it in a heated water bath or a drying chamber at atmospheric pressure. The temperature of the drying chamber must not exceed 100° C. and care should be taken that it does not fall below 90° C., so that the hardening takes place at a temperature varying between 90° and 100° C. The time required for a thorough conversion of the mass into the final state varies between 8 and 36 hours and depends upon the size and thickness of the moulded article.

The articles thus produced can be worked just as well as natural ivory, horn, bone, amber and the like and present the same appearance.

What we claim and desire to be protected by Letters Patent, is:—

1. A process for making resinous products of condensation from phenol and formaldehyde of ivory like appearance, consisting in heating phenol and formaldehyde in the presence of an acid condensing agent, adding to the mass phenol and formaldehyde and an alkaline condensing agent in excess, then adding a liquid capable of increasing the elasticity of the mass, namely amyl alcohol plus glycerine, boiling the mass until all the water is driven out and finally hardening it by heating at atmospheric pressure, substantially as described.

2. A process for making resinous products of condensation from phenol and formaldehyde of ivory like appearance, consisting in heating phenol and formaldehyde in the presence of an acid condensing agent, adding to the mass phenol and formaldehyde and an alkaline condensing agent in excess, then adding a liquid capable of increasing the elasticity of the mass, namely amyl alcohol plus camphor oil, boiling the mass until all the water is driven out and finally hardening it by heating at atmospheric pressure, substantially as described.

3. A process for making resinous products of condensation from phenol and formaldehyde of ivory like appearance, consisting in heating phenol and formaldehyde in the presence of an acid condensing agent, adding to the mass phenol and formaldehyde and an alkaline condensing agent in excess, then adding a liquid capable of increasing the elasticity of the mass, namely amyl alcohol plus camphor oil and glycerine, boiling the mass until all the water is driven out and finally hardening it by heating at atmospheric pressure, substantially as described.

4. A process for making resinous products of condensation from phenol and formaldehyde of ivory like appearance, consisting in heating phenol and formaldehyde in the presence of an acid condensing agent, adding to the mass phenol and formaldehyde and an alkaline condensing agent in excess, then adding a liquid capable of increasing the elasticity of the mass, namely amyl alcohol plus glycerine, boiling the mass until all the water is driven out, adding glacial acetic acid and finally hardening it by heating at atmospheric pressure, substantially as described.

5. A process for making resinous products of condensation from phenol and formaldehyde of ivory like appearance, consisting in heating phenol and formaldehyde in the presence of an acid condensing agent, adding to the mass phenol and formaldehyde and an alkaline condensing agent in excess, then adding a liquid capable of increasing the elasticity of the mass, namely amyl alcohol plus camphor oil, boiling the mass until all the water is driven out, adding glacial acetic acid and finally hardening it by heating at atmospheric pressure, substantially as described.

6. A process for making resinous products of condensation from phenol and formaldehyde of ivory like appearance, consisting in heating phenol and formaldehyde in the presence of an acid condensing agent, adding to the mass phenol and formaldehyde and an alkaline condensing agent in excess, then adding a liquid capable of increasing the elasticity of the mass, namely amyl alcohol plus camphor oil and glycerine, boiling the mass until all the water is driven out, adding glacial acetic acid and finally hardening it by heating at atmospheric pressure, substantially as described.

In testimony whereof we affix our signatures.

CARL KULAS.
CURT PAULING.